United States Patent
Gupta

(10) Patent No.: US 8,055,850 B2
(45) Date of Patent: Nov. 8, 2011

(54) PRIORITIZATION OF DIRECTORY SCANS IN CACHE

(75) Inventor: Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/418,777

(22) Filed: Apr. 6, 2009

(65) Prior Publication Data

US 2010/0257321 A1 Oct. 7, 2010

(51) Int. Cl.
*G06F 12/00* (2006.01)
(52) U.S. Cl. ......... 711/138; 711/118; 711/133; 711/129
(58) Field of Classification Search .................. 711/138, 711/118, 129, 114, 133–136; 710/200
See application file for complete search history.

(56) References Cited

U.S. PATENT DOCUMENTS

| | | | |
|---|---|---|---|
| 4,414,644 A | 11/1983 | Tayler | |
| 4,636,946 A | 1/1987 | Hartung et al. | |
| 5,636,359 A | 6/1997 | Beardsley et al. | |
| 6,141,731 A | 10/2000 | Beardsley et al. | |
| 6,738,865 B1 | 5/2004 | Burton et al. | |
| 6,785,771 B2 | 8/2004 | Ash et al. | |
| 7,124,249 B1 | 10/2006 | Darcy et al. | |
| 7,698,507 B2 * | 4/2010 | Ghetie | 711/138 |
| 2003/0149843 A1 | 8/2003 | Jarvis et al. | |
| 2006/0090036 A1 | 4/2006 | Zohar et al. | |
| 2007/0118695 A1 | 5/2007 | Lowe et al. | |
| 2007/0174428 A1 | 7/2007 | Lev Ran et al. | |
| 2008/0250200 A1 | 10/2008 | Jarvis et al. | |
| 2009/0006789 A1 | 1/2009 | LaFrese et al. | |

* cited by examiner

*Primary Examiner* — David Lam
(74) *Attorney, Agent, or Firm* — Griffiths & Seaton PLLC

(57) ABSTRACT

A method, system, and computer program product for prioritizing directory scans in cache by a processor is provided. While traversing a directory in the cache, one of attempting to acquire a lock for a directory entry and attempting to acquire access to a track in the directory entry is performed. If one of the lock is not obtained for the directory entry and the access to the track in the directory entry is not obtained, the directory entry is added to a reserved data space. Following completion of traversing the directory, a return is made to the reserved data space to process the directory entry and the track in the directory entry.

25 Claims, 3 Drawing Sheets

PRIORITIZATION OF DIRECTORY SCANS IN CACHE

BACKGROUND OF THE INVENTION

1. Field of the Invention

The present invention relates in general to computers, and more particularly to a method, system, and computer program product for prioritizing certain cache directory scans for better performance.

2. Description of the Related Art

Cache memories in computer systems have associated directories of entries of data files. Various kinds of directory scan commands ensure that the directory and associated files in a particular cache is current. A DISCARD scan discards or demotes tracks of data from the cache directory that meet the criteria of the scan. A COMMIT scan synchronously destages tracks from the cache directory that meet the criteria of the scan. Because COMMIT scans involve the synchronous destage of data from the cache to disk, they consume more computing resources and take more time to execute than do other scans, such as DISCARD scans which are not as resource intensive.

SUMMARY OF THE INVENTION

Each directory scan traverses the cache directory in order. A particular scan has to wait for a lock on the directory entry and the tracks in the directory entry. As a result, if there are two scans proceeding at one time, then one scan will always remain ahead of the other scan. When both COMMIT and DISCARD scans are running, a DISCARD scan may be delayed behind a COMMIT scan. Even though a DISCARD scan is lightweight in nature, it may only proceed as fast as a COMMIT scan ahead of it. Accordingly, DISCARD scans execute slowly when COMMIT scans are executing ahead of them in the cached system.

In view of the foregoing, a need exists for a mechanism by which certain scans, such as DISCARD scans may be prioritized in execution ahead of other scans, such as COMMIT scans to allow for greater system performance. Accordingly, in one embodiment, by way of example only, a method for prioritizing directory scans of cache having a plurality of directory entries by a processor in communication with the cache is provided. The plurality of directory entries is traversed. Acquisition of a lock for a directory entry of the plurality of directory entries is attempted. If the acquisition of the lock fails, the directory entry is added to a reserved portion of a data structure. If the acquisition of the lock succeeds, acquisition of an access to a track in the directory entry is attempted. If the acquisition of the access to the track fails, the directory entry is added to the reserved portion of the data structure. If the acquisition of the access to the track succeeds and if a criterion is met, the track is discarded.

In another embodiment, again by way of example only, a method for prioritizing directory scans in cache by a processor is provided. While traversing a directory in the cache, one of attempting to acquire a lock for a directory entry and attempting to acquire access to a track in the directory entry is performed. If one of the lock is not obtained for the directory entry and the access to the track in the directory entry is not obtained, the directory entry is added to a reserved data space. Following completion of traversing the directory, a return is made to the reserved data space to process the directory entry and the track in the directory entry. Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for prioritizing certain scans in cache, so that one particular scan type does not potentially become backlogged behind another scan type, providing for greater system performance. These embodiments include use of a reserved data space in which some directory entries are temporarily placed until they are later processed. Using the reserved data space, a procedure is put in place whereby some scans may leapfrog over other scans. For example, DISCARD scans may leapfrog over COMMIT scans, as the COMMIT scans are temporarily placed on hold using the reserved data space. This procedure will be further detailed, following.

Some of the illustrated embodiments as described below may take advantage of the fact that if DISCARD scans are ahead of COMMIT scans, then some of the tracks that COMMIT scans were going to destage may be demoted out of cache by the DISCARD scan. As a result, the COMMIT scan may run faster since they have less data to destage. In addition, if the DISCARD scan runs ahead of the COMMIT scan, then the DISCARD scan completes more quickly since it is not gated behind the COMMIT scan.

Figure 1:
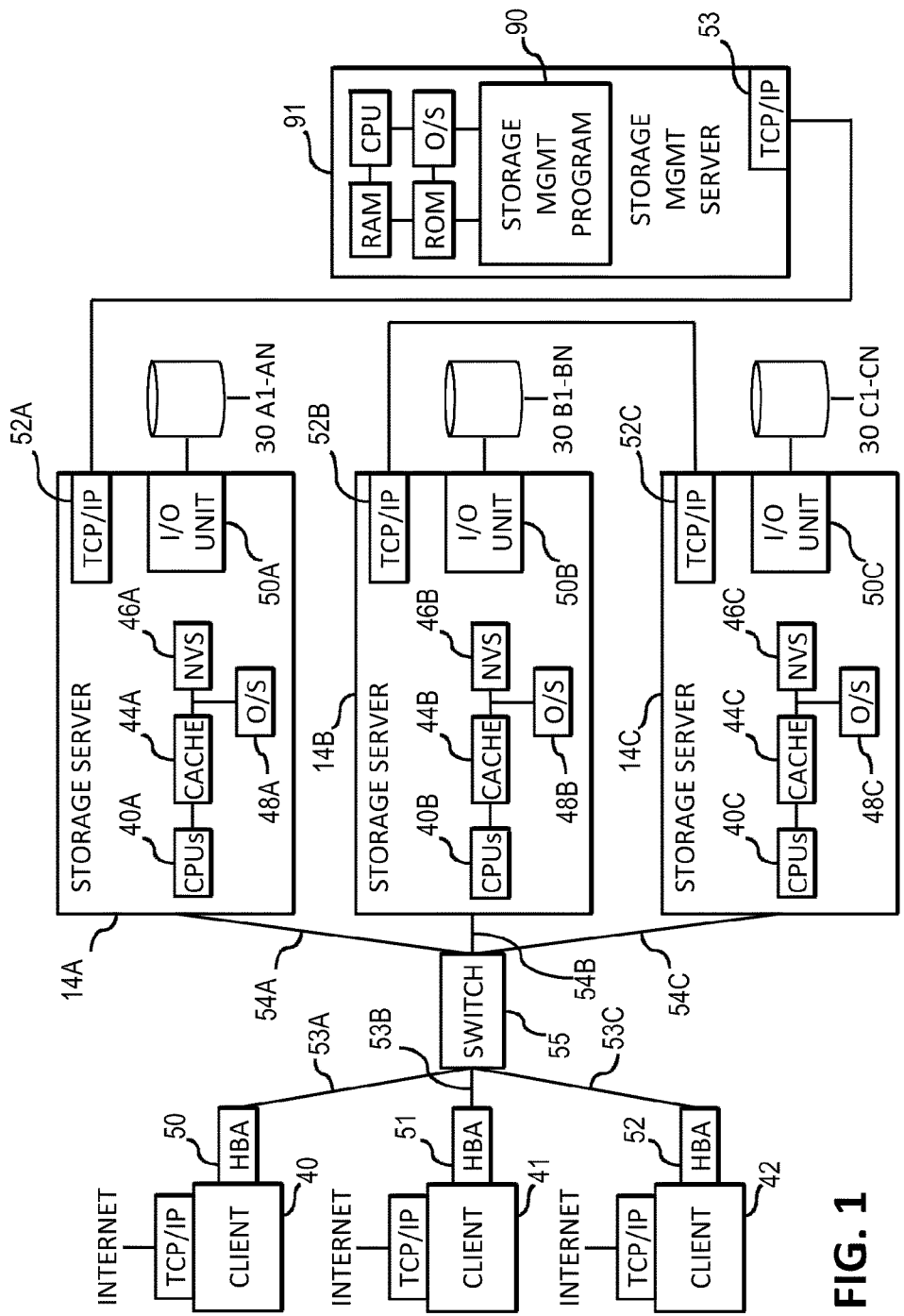
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers/controllers 14 $a,b,c$ with multiple CPUs 40 $a,b,c$ per cluster (See FIG. 2, following, for CPU organization in each cluster), cache 44 $a,b,c$, nonvolatile storage ("NVS") 46 $a,b,c$, operating system 48 $a,b,c$, I/O unit 50 $a,b,c$, and TCP/IP adapter card 52 $a,b,c$. Each of the storage servers 14 $a,b,c$ manages storage allocation and access to multiple storage devices (such as disks) 30$a$1-an, 30$b$1-bn, and 30 $c$1-cn, respectively, by clients 40, 41 and 42.

Clients 40, 41 and 42 have adapter cards 50, 51 and 52, such as a Fibre Channel adapter cards, for connection via a communication path 53 *a,b,c*, such as a Fibre Channel, to a switch 55. Switch 55 can be coupled to storage servers 14 *a,b,c* via host busses 54 *a,b,c*, and can forward a request from any of the clients 40, 41 or 42 to any of the storage servers 14, *a,b,c* as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
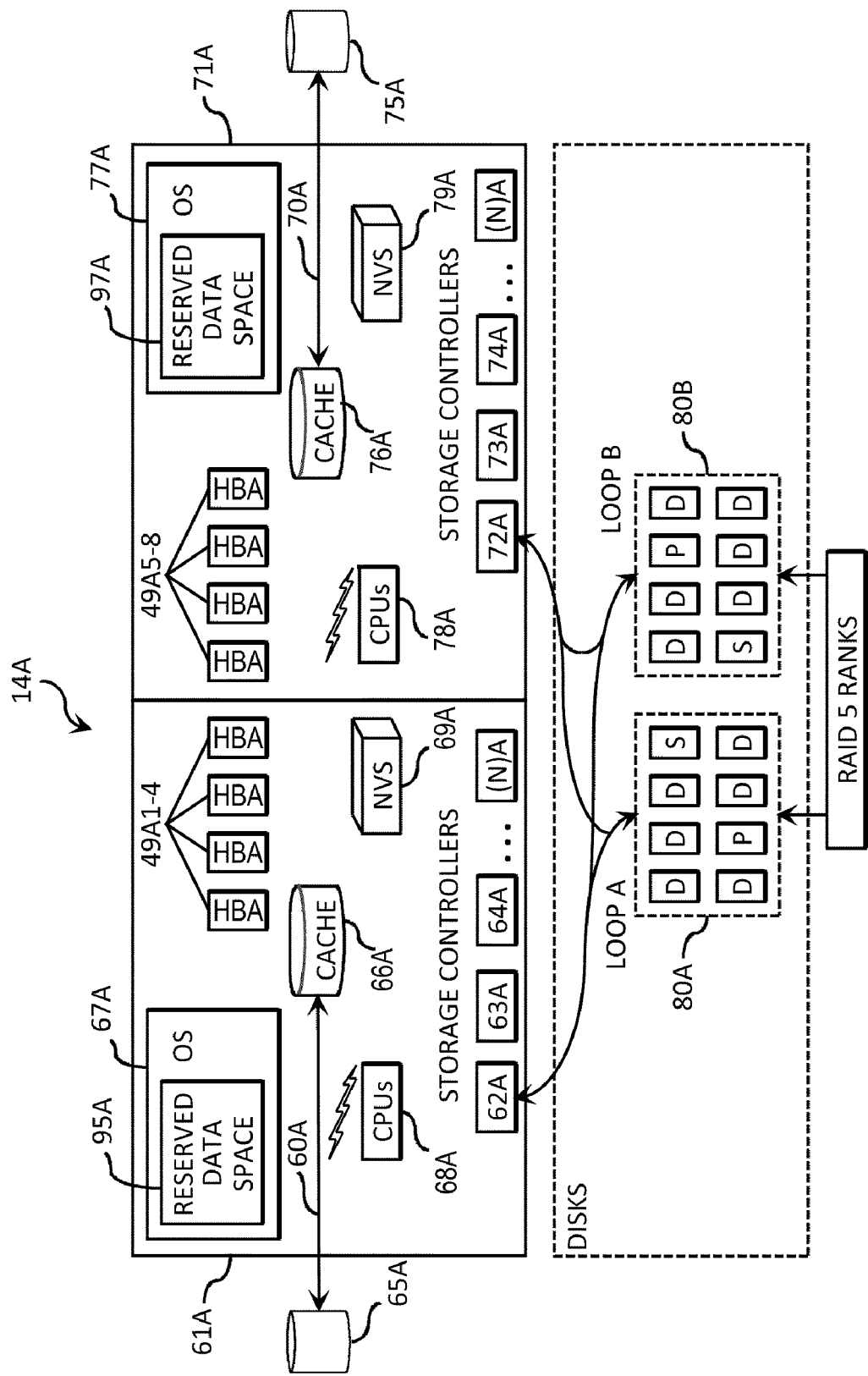
FIG. 2 is a block diagram of one of the storage servers of FIG. 1.

In the exemplary embodiment illustrated in FIG. 2, storage controller 14*a* (and likewise storage controller 14*b* and *c*) includes two identical clusters 61*a* and 71*a* of CPUs 68*a* and 78*a*, cache 66*a* and 76*a*, NVS 69*a* and 79*a*, and any number of pairs of device adapters (62*a*-(N)a and 72*a*-(N)a per cluster). There is a shared cache (semiconductor) memory 66*a* and 76*a* for each cluster 61*a* and 71*a*, respectively. Cache 66*a* and 76*a* each contain a directory of data files stored on each cache, respectively. The directory includes any number of directory entries associated with each of the data files.

Each cluster also contains battery backed-up storage 69*a* and 79*a* (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

NVS 69*a* and 79*a* are interconnected with disks 65*a* and 75*a* via communication links 60*a* and 70*a*, respectively. In certain embodiments, communication links 60*a* and 70*a* are selected from a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, disks 65*a* and 75*a* comprise one or more optical storage media, one or more magnetic storage media, one or more electronic storage media, and combinations thereof. In certain embodiments, disks 65*a* and 75*a* are external to clusters 61*a* and 71*a*. In certain embodiments, disks 65*a* and 75*a* are internal to clusters 61*a* and 71*a*.

When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14 *a,b,c* via a SAN network. Alternately, there can be a separate instance of module 90 executing on each storage server/controller 14 *a,b,c* and communicating with the other instances of program 90 on the other storage servers via a TCP/IP network. The skilled artisan will appreciate that a variety of implementations of SMP module in communication with the overall storage subsystem are contemplated.

Referring again to FIG. 2, server 14*a* is shown including operating systems 67*a* and 77*a*, one for each cluster. As the skilled artisan will appreciate, operating systems 67*a* and 77*a* may be physically or virtually placed in a variety of locations. For purposes of illustration, the operating systems 67*a* and 77*a* are shown incorporated into each cluster as shown. In one embodiment, CPUs 68*a* and 78*a* may execute portions of the operating systems 67*a* and 77*a*. Each operating system 67*a* and 77*a* includes reserved data spaces 95*a*, 97*a*, as is shown. In one embodiment, reserved data spaces 95*a* and 97*a* may be a process control block/task control block (PCB/TCB) space reserved in the kernel of the operating systems 68*a* and 78*a*. While reserved data spaces 95*a* and 97*a* are shown incorporated into the operating systems 68*a* and 78*a*, the skilled artisan will appreciate that the reserved data spaces may be physically or logically located elsewhere, yet remain in communication with the depicted CPUs, cache memory, NVS, etc. The functionality of reserved data spaces 95*a* and 97*a* will be further described, following.

As was previously described, the illustrated embodiments provide mechanisms for prioritizing directory scans in cache so as to improve system performance. These mechanisms allow a scan such as the DISCARD scan to leapfrog another scan that it is gated behind, such as the COMMIT scan. These mechanisms use the reserved data space illustrated above to serve as a placeholder for certain directory entries that will be later processed. As the skilled artisan will appreciate, these mechanisms may be carried out with the assistance of one or more processors (such as CPUs 68*a* and 78*a* (FIG. 2) in communication with the cache.

In one embodiment the mechanisms of the present invention may operate as follows. A space for N cache directory entries may be created in the reserved data space, such as PCB/TSB space. Entries placed into this space may be referred to herein as skipped directory entries. Once the reserved data space is created, the cache directory is traversed. For each directory entry in the cache, an attempt is made to acquire a lock ("try acquire"). A try acquire attempt will succeed if another process is not currently holding the lock. Otherwise, the try acquire attempt will fail. If the attempt fails, then the directory entry failing lock is placed into the reserve data space as a skipped directory entry, and another attempt to obtain a lock is made on a subsequent entry in the directory.

If a lock is obtained, the system may then attempt to obtain access to a first data track in the directory. If access is not obtained, then the directory entry associated with the first data track is moved to the reserved data space again as a skipped directory entry, and the system then moves to the next directory entry to make another try acquire attempt. If access is obtained, then the system determines if the track meets a predetermined criterion. If this is the case, then the track is either demoted or discarded. Once all directory entries (and the associated tracks) have been attempted against as described above, then the system turns again to the reserved data space to process the skipped directory entries. In this case, for each directory entry an acquire directory entry lock is obtained by waiting until the lock is released from another process, if necessary. For each directory entry in lock, each track in the directory entry in lock is then acquired access to, again waiting if necessary to obtain the access. Tracks that meet criteria are then discarded.

Figure 3:
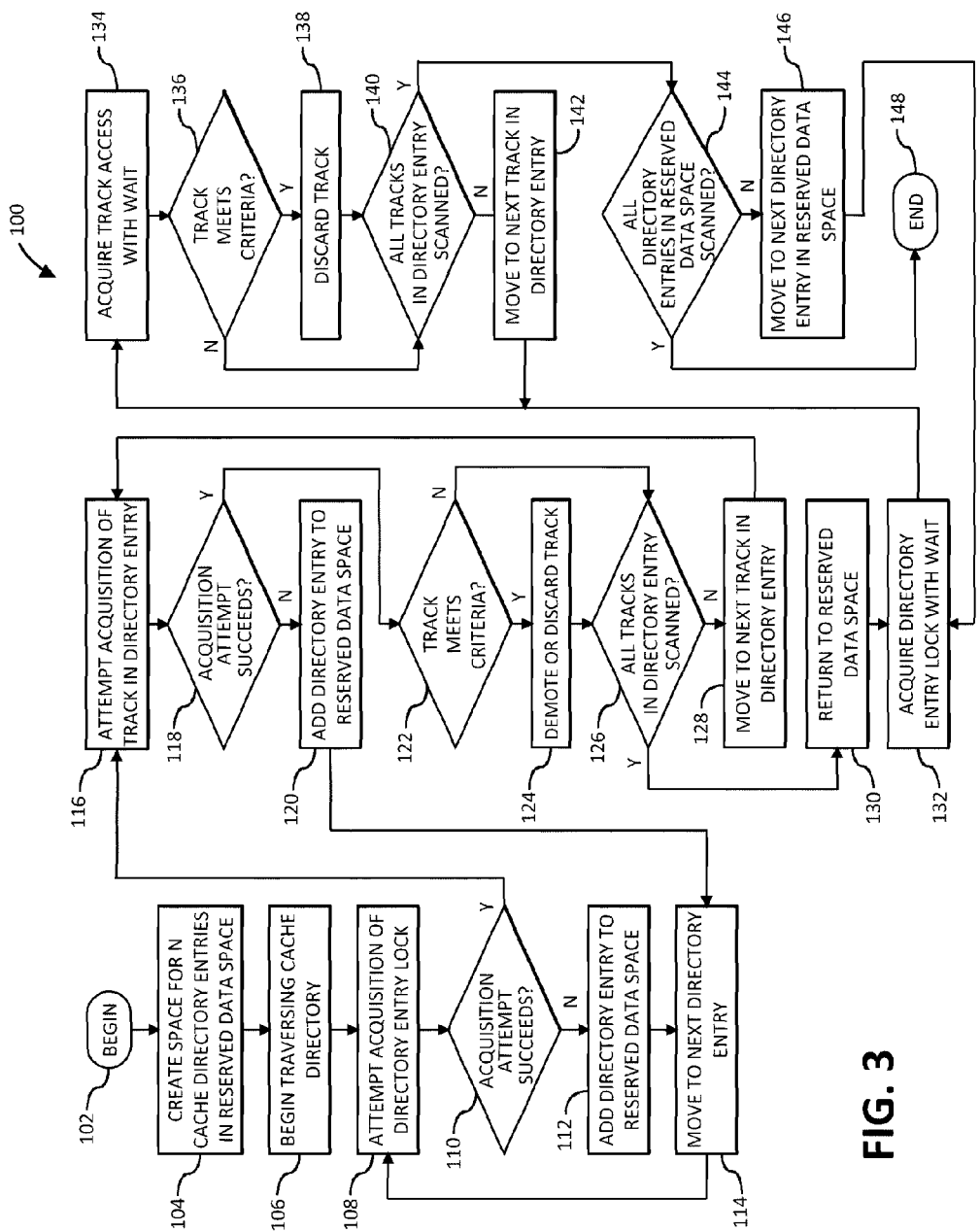
FIG. 3 is a flow chart of an exemplary method for prioritizing scans in cache.

Turning to FIG. 3, following, an exemplary method 100 for prioritizing directory scans in cache is illustrated. As one skilled in the art will appreciate, various steps in the method 100 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) with the creation of N space for cache directory entries in a reserved data space as previously described (step 104). The cache directory is then traversed (step 106). A first acquisition is attempted of a directory entry lock for a directory entry (step 108). If the acquisition attempt does not succeed (step 110), then the directory entry is added to the reserved data space as a skipped directory entry (step 112), and the system moves to the next directory entry for analysis (step 114). If the acquisition attempt succeeds (again, step 110), then an attempt for track acquisition/access is made for the first track in the directory entry (step 116). If the acquisition attempt does not succeed (step 118), then the directory entry is added to the reserved data space as a skipped directory entry (step 120), and the system moves to the next directory entry (again, step 114).

If the track access is successful (again, step 118), then the track is analyzed to determine if it meets a predetermined criterion. If this is the case (step 122), then the track is demoted or discarded per the criterion (step 124), and method 100 moves to step 126, which queries if all the tracks in a particular directory entry in lock have been scanned (step 126). If no, then the system moves to the next track in the directory entry for analysis (step 128), and the method 100 returns to step 116 to analyze additional tracks. The process of attempting directory entry locks on each directory entry, and then attempting track access for each of the tracks for a particular directory entry in lock are repeated until each of the directory entries have been attempted in this manner, and each track for each of these directory entries have been attempted (again, step 126, continuing to step 130). In this way, for example, each DISCARD scan is allowed forward while COMMIT scans that would otherwise hold back other DISCARD scans are postponed.

At step 130, the method 100 returns to the reserved data space to process the skipped directory entries. In one embodiment, these entries would be entries to be processed according to COMMIT scans. As a next step, an entry lock for first directory entry in the reserved data space is acquired, where the system waits if necessary for other processes to release the lock to obtain the lock (step 132). Once a lock is obtained, a track access request is made for the first track in the directory entry, again waiting if necessary until the access is obtained (step 134). Once the access is obtained, then the track is analyzed to determine if it meets criteria (step 136). If this is the case, then the track is discarded per the criterion (step 138), and step 140 queries if all the tracks in the directory entry in lock have been accessed accordingly (step 140).

If tracks remain, then the next track in the instant directory entry is accessed with wait per the foregoing mechanism (again, steps 134-138) until each of the tracks for the instant directory entry has been processed. Once all tracks for the instant directory entry have been processed (again, step 140), then the method 100 queries if all the directory entries in the reserved data space have been scanned (step 144). If not, then the system moves to the subsequent directory entry in the reserved data space, and continues steps 132-142, discarding tracks that meet criteria as previously described. Once all directory entries in the reserved data space have been processed (again, step 144), the method ends (step 148).

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for prioritizing directory scans of cache having a plurality of directory entries by a processor in communication with the cache, comprising:
    traversing the plurality of directory entries; and
    attempting acquisition of a lock for a directory entry of the plurality of directory entries, wherein:
        if the acquisition of the lock fails, adding the directory entry to a reserved portion of a data structure, and
        if the acquisition of the lock succeeds, attempting acquisition of an access to a track in the directory entry, wherein:
            if the acquisition of the access to the track fails, adding the directory entry to the reserved portion of the data structure, and
            if the acquisition of the access to the track succeeds and if a criterion is met, discarding the track.

2. The method of claim 1, further including continuing to attempt acquisition of additional locks for additional directory entries, adding directory entries corresponding to a failed lock to the reserved portion of the data structure, and continuing to attempt acquisition of additional accesses to tracks in the additional directory entries, adding directory entries corresponding to a failed track access to the reserved portion of the data structure, until each of the plurality of directory entries has been traversed.

3. The method of claim 2, further including, for each of the directory entry and the additional directory entries in the reserved portion of the data structure:
    acquiring the lock, waiting until the lock is obtained, and for each track in a directory entry in lock,
        acquiring access to one track, waiting until the access to the one track is obtained, and
        discarding the one track if the criterion is met.

4. The method of claim 1, further including creating the reserved portion of the data structure.

5. The method of claim 4, wherein creating the reserved portion of the data structure includes reserving a portion of a process control block/task control block (PCB/TCB) space.

6. The method of claim 1, wherein traversing the plurality of directory entries is performed in a storage controller cache of a data storage subsystem.

7. A method for prioritizing directory scans in cache by a processor, comprising:
    while traversing a directory in the cache, performing one of attempting to acquire a lock for a directory entry and attempting to acquire access to a track in the directory entry, wherein if one of the lock is not obtained for the directory entry and the access to the track in the directory entry is not obtained, adding the directory entry to a reserved data space; and following completion of traversing the directory, returning to the reserved data space to process the directory entry and the track in the directory entry.

8. The method of claim 7, further including, if the lock is obtained for the one directory entry, performing the attempting to acquire the access to the track in the directory entry, wherein if the access to the track in the directory entry is not obtained, adding the directory entry to the reserved data space.

9. The method of claim 8, further including, if the access to the track in the directory entry is obtained, and if a criterion is met, discarding the track.

10. The method of claim 8, further including continuing to perform the one of attempting to acquire the lock for the directory entry and the attempting to acquire the access to the track in the directory entry until the directory is traversed.

11. The method of claim 7, wherein returning to the reserved data space to process the directory and the track in the directory entry further includes acquiring the lock for the directory entry, waiting until the lock is obtained, and acquiring access to the track in the directory entry, waiting until the access is obtained, and discarding the track if a criterion is met.

12. The method of claim 7, further including creating the reserved data space.

13. The method of claim 12, wherein creating the reserved data space includes reserving a portion of a process control block/task control block (PCB/TCB) space.

14. A system for prioritizing directory scans of cache having a plurality of directory entries, comprising:
a processor device in communication with the cache, wherein the processor device is adapted for:
traversing the plurality of directory entries; and
attempting acquisition of a lock for a directory entry of the plurality of directory entries, wherein:
if the acquisition of the lock fails, adding the directory entry to a reserved portion of a data structure, and
if the acquisition of the lock succeeds, attempting acquisition of an access to a track in the directory entry, wherein:
if the acquisition of the access to the track fails, adding the directory entry to the reserved portion of the data structure, and
if the acquisition of the access to the track succeeds and if a criterion is met, discarding the track.

15. The system of claim 14, wherein the processor device is further adapted for continuing to attempt acquisition of additional locks for additional directory entries, adding directory entries corresponding to a failed lock to the reserved portion of the data structure, and continuing to attempt acquisition of additional accesses to tracks in the additional directory entries, adding directory entries corresponding to a failed track access to the reserved portion of the data structure, until each of the plurality of directory entries has been traversed.

16. The system of claim 15, wherein the processor device is further adapted for, for each of the directory entry and the additional directory entries in the reserved portion of the data structure:
acquiring the lock, waiting until the lock is obtained, and for each track in a directory entry in lock,
acquiring access to one track, waiting until the access to the one track is obtained, and
discarding the one track if the criterion is met.

17. The system of claim 14, wherein the processor device is further adapted for creating the reserved portion of the data structure.

18. The system of claim 17, wherein the reserved portion of the data structure is a portion of a process control block/task control block (PCB/TCB) space.

19. The system of claim 14, wherein the plurality of directory entries are incorporated into a storage controller cache of a data storage subsystem.

20. A computer program product for prioritizing directory scans of cache having a plurality of directory entries by a processor in communication with the cache, the computer program product comprising a computer-readable storage medium having computer-readable program code portions stored therein, the computer-readable program code portions comprising:
a first executable portion for traversing the plurality of directory entries; and
a second executable portion for attempting acquisition of a lock for a directory entry of the plurality of directory entries, wherein:
if the acquisition of the lock fails, adding the directory entry to a reserved portion of a data structure, and
if the acquisition of the lock succeeds, attempting acquisition of an access to a track in the directory entry, wherein:
if the acquisition of the access to the track fails, adding the directory entry to the reserved portion of the data structure, and
if the acquisition of the access to the track succeeds and if a criterion is met, discarding the track.

21. The computer program product of claim 20, further including a third executable portion for continuing to attempt acquisition of additional locks for additional directory entries, adding directory entries corresponding to a failed lock to the reserved portion of the data structure, and continuing to attempt acquisition of additional accesses to tracks in the additional directory entries, adding directory entries corresponding to a failed track access to the reserved portion of the data structure, until each of the plurality of directory entries has been traversed.

22. The computer program product of claim 21, further including a fourth executable portion for, for each of the directory entry and the additional directory entries in the reserved portion of the data structure:
acquiring the lock, waiting until the lock is obtained, and for each track in a directory entry in lock,
acquiring access to one track, waiting until the access to the one track is obtained, and
discarding the one track if the criterion is met.

23. The computer program product of claim 20, further including a third executable portion for creating the reserved portion of the data structure.

24. The computer program product of claim 23, wherein the third executable portion for creating the reserved portion of the data structure includes a fourth executable portion for reserving a portion of a process control block/task control block (PCB/TCB) space.

25. The computer program product of claim 20, wherein traversing the plurality of directory entries is performed in a storage controller cache of a data storage subsystem.

* * * * *